US012759623B2

(12) United States Patent
Lu et al.

(10) Patent No.: US 12,759,623 B2
(45) Date of Patent: Oct. 13, 2026

(54) MODEL PREDICTIVE CONTROL FOR AUTOMATED DRIVING IN COMPLEX GEOMETRIES

(71) Applicant: GM GLOBAL TECHNOLOGY OPERATIONS LLC, Detroit, MI (US)

(72) Inventors: Jimmy Lu, Stouffville (CA); Amirreza Mirbeygi Moghaddam, North York (CA); Reza Zarringhalam, Whitby (CA); Milad Jalaliyazdi, Richmond Hill (CA); Jackson Barry McGrory, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/039,222

(22) Filed: Jan. 28, 2025

(65) Prior Publication Data

US 2026/0217308 A1 Jul. 30, 2026

(51) Int. Cl.

*B62D 6/00* (2006.01)
*B60W 50/00* (2006.01)
*B60W 60/00* (2020.01)

(52) U.S. Cl.

CPC ......... *B62D 6/001* (2013.01); *B60W 50/0097* (2013.01); *B60W 60/001* (2020.02); *B60W 2420/403* (2013.01); *B60W 2552/53* (2020.02)

(58) Field of Classification Search

CPC . B62D 6/001; B60W 50/0097; B60W 60/001; B60W 2420/403; B60W 2552/53
See application file for complete search history.

(56) References Cited

U.S. PATENT DOCUMENTS 9,862,410 B2 * 1/2018 Oyama ................ G05D 1/0268
10,650,253 B2 * 5/2020 Bayer ................... G06F 18/253
(Continued)

FOREIGN PATENT DOCUMENTS

DE 102006007250 A1 * 9/2006 ............. B62D 6/002
DE 102016214045 A1 2/2018
(Continued)

OTHER PUBLICATIONS

KR_101358329_B1_I_translation (Year: 2014).*
(Continued)

*Primary Examiner* — Kyle T Johnson
(74) *Attorney, Agent, or Firm* — CANTOR COLBURN LLP

(57) ABSTRACT

Examples provide a method for model predictive control for automated driving in complex geometries. The method includes receiving road lane line information from a first camera associated with a first side of a vehicle, a second camera associated with a second side of the vehicle, and map data. The method further includes initiating a perception task using the road lane line information and determining that the perception task is disturbed due to road lane geometry. The method further includes generating patches of a target path, each of the patches having an associated confidence value. The method further includes generating a combined target path by stitching together the patches of the target path. The method further includes generating, using the combined target path, desired steering commands for the vehicle. The method further includes controlling the vehicle using the desired steering commands to cause the vehicle to follow the combined target path.

20 Claims, 6 Drawing Sheets

(56) References Cited

U.S. PATENT DOCUMENTS

| | | | | |
|---|---|---|---|---|
| 11,648,945 | B2 * | 5/2023 | Sajjadi | B60W 30/18154 382/104 |
| 2018/0024562 | A1 * | 1/2018 | Bellaiche | B60R 1/025 701/26 |
| 2018/0025235 | A1 * | 1/2018 | Fridman | H04N 23/90 382/103 |
| 2018/0173970 | A1 * | 6/2018 | Bayer | G06F 18/253 |
| 2021/0107522 | A1 * | 4/2021 | Goto | B60W 60/0011 |
| 2022/0169280 | A1 | 6/2022 | Brown et al. | |
| 2022/0388515 | A1 * | 12/2022 | Carlson | B60W 10/20 |
| 2023/0311931 | A1 * | 10/2023 | Laws | G07C 5/02 701/25 |
| 2025/0242861 | A1 * | 7/2025 | Kuribara | B62D 15/025 |

FOREIGN PATENT DOCUMENTS

| | | | | |
|---|---|---|---|---|
| JP | 2021126935 | A * | 9/2021 | |
| KR | 101358329 | B1 * | 2/2014 | B62D 15/025 |
| KR | 20230076613 | A * | 5/2023 | B60W 30/10 |
| WO | WO-2009073128 | A2 * | 6/2009 | B60W 50/0097 |
| WO | WO-2019088280 | A1 * | 5/2019 | G01S 13/08 |

OTHER PUBLICATIONS

KR_20230076613_A_I_translation (Year: 2023).*
WO_2019088280_A1_I_translation (Year: 2019).*
Enhancing_safety_in_autonomous_vehicle_navigation (Year: 2024).*
Spatio-temporal_risk_prediction-based_longitudinal_motion_control (Year: 2025).*
JP-2021126935-A translation (Year: 2021).*
DE-102006007250-A1 translation (Year: 2006).*
1 German Office Action for German Application No. 102025109746.1; dated Oct. 7, 2025; 6 pages.

* cited by examiner

MODEL PREDICTIVE CONTROL FOR AUTOMATED DRIVING IN COMPLEX GEOMETRIES

BACKGROUND

The subject disclosure relates to vehicles, and in particular to model predictive control for automated driving in complex geometries.

Modern vehicles (e.g., a car, a motorcycle, a boat, or any other type of automobile) may be equipped with one or more cameras that provide back-up assistance, take images of the vehicle driver to determine driver drowsiness or attentiveness, provide images of the road as the vehicle is traveling for collision avoidance purposes, provide structure recognition (e.g., roadway signs, etc.), and/or the like, including combinations and/or multiples thereof. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), lidar device(s), and/or the like for perception tasks. Radar (radio detection and ranging) is a technology that uses radio waves to detect and determine the distance, speed, and angle of objects. Radar works by emitting radio signals that bounce off objects and return to the radar system, where the reflected waves are analyzed based on the amount of time between emission and reception. The measured time can be used to determine the distance between the radar device and the detected object, which can be used when performing perception tasks.

Perception tasks can include one or more of object detection, classification, tracking, lane detection, road sign recognition, and obstacle avoidance. Perception tasks are particularly useful for an autonomous or semi-autonomous vehicle to provide the vehicle with real-time awareness of its environment to make safe and informed driving decisions. Images from the one or more cameras of the vehicle can also be used for detecting objects, tracking targets, and/or the like, including combinations and/or multiples thereof. Perception tasks are useful for implementing advanced driver assistance systems (ADASs).

The desire for precise vehicle control using ADASs is important for efficient operation of the vehicle.

SUMMARY

In one embodiment, a computer-implemented method for model predictive control for automated driving in complex geometries is provided. The method includes receiving road lane line information from a first camera associated with a first side of a vehicle, a second camera associated with a second side of the vehicle, and map data. The method further includes initiating a perception task using the road lane line information. The method further includes determining that the perception task is disturbed due to road lane geometry. The method further includes generating patches of a target path, each of the patches having an associated confidence value. The method further includes generating a combined target path by stitching together the patches of the target path. The method further includes generating, using the combined target path, desired steering commands for the vehicle. The method further includes controlling the vehicle using the desired steering commands to cause the vehicle to follow the combined target path.

In addition to one or more of the features described herein, or as an alternative, further embodiments of the method may include that generating the patches of the target path includes generating a first patch using the road lane line information from the first camera.

In addition to one or more of the features described herein, or as an alternative, further embodiments of the method may include that generating the patches of the target path further includes generating a second patch using the road lane line information from the second camera.

In addition to one or more of the features described herein, or as an alternative, further embodiments of the method may include that generating the patches of the target path further includes generating a third patch using the road lane line information from the map data.

In addition to one or more of the features described herein, or as an alternative, further embodiments of the method may include that generating the combined target path by stitching together the patches of the target path includes stitching together at least two of the first patch, the second patch, and the third patch.

In addition to one or more of the features described herein, or as an alternative, further embodiments of the method may include that generating the combined target path by stitching together the patches of the target path includes stitching together the first patch, the second patch, and the third patch.

In addition to one or more of the features described herein, or as an alternative, further embodiments of the method may include that generating the desired steering commands for the vehicle includes calculating a cost function using the associated confidence value for each of the patches and a weight associated with each of the patches.

In addition to one or more of the features described herein, or as an alternative, further embodiments of the method may include that the cost function is calculated according to the following equation:

$$C = \sum_{k=1}^{p} \{c_1 w_1 (Y + Y_c - Y_{r,1})^2 + c_2 w_2 (Y + Y_c - Y_{r,2})^2 + c_3 w_3 (Y + Y_c - Y_{r,3})^2 + w_{\Delta u}(u_k - u_{k-1})^2 + w_u (u_k - u_{ref})^2\}$$

where C is the cost function, $c_i$ is the associated confidence value of the target for source i, $w_i$ is the weight value for patches of source i target, associated with each source, Y is a predicted output of the vehicle, $Y_c$ is a camera performance bias for lateral position, $Y_r$ is the target based on source i, u is a steering angle command, $u_k$ is a steering angle command at a current step, and $u_{ref}$ is a steering angle reference.

In another embodiment, a vehicle is provided. The vehicle includes a first camera, a second camera, a vehicle plant, and a processing system. The processing system includes a memory having computer readable instructions and a processing device for executing the computer readable instructions, the computer readable instructions controlling the processing system to perform operations for model predictive control for automated driving in complex geometries. The operations include receiving road lane line information from the first camera, the second camera, and map data. The operations further include initiating a perception task using the road lane line information. The operations further include determining that the perception task is disturbed due to road lane geometry. The operations further include generating patches of a target path, each of the patches having an associated confidence value. The operations further include generating a combined target path by stitching together the patches of the target path. The operations further include generating, using the combined target path, desired steering commands for the vehicle. The operations further include controlling the vehicle using the desired steering commands to cause the vehicle to follow the combined target path.

In addition to one or more of the features described herein, or as an alternative, further embodiments of the vehicle may include that generating the patches of the target path includes generating a first patch using the road lane line information from the first camera.

In addition to one or more of the features described herein, or as an alternative, further embodiments of the vehicle may include that generating the patches of the target path further includes generating a second patch using the road lane line information from the second camera.

In addition to one or more of the features described herein, or as an alternative, further embodiments of the vehicle may include that generating the patches of the target path further includes generating a third patch using the road lane line information from the map data.

In addition to one or more of the features described herein, or as an alternative, further embodiments of the vehicle may include that generating the combined target path by stitching together the patches of the target path includes stitching together at least two of the first patch, the second patch, and the third patch.

In addition to one or more of the features described herein, or as an alternative, further embodiments of the vehicle may include that generating the combined target path by stitching together the patches of the target path includes stitching together the first patch, the second patch, and the third patch.

In addition to one or more of the features described herein, or as an alternative, further embodiments of the vehicle may include that generating the desired steering commands for the vehicle includes calculating a cost function using the associated confidence value for each of the patches and a weight associated with each of the patches.

In addition to one or more of the features described herein, or as an alternative, further embodiments of the vehicle may include that the cost function is calculated according to the following equation:

$$C = \sum_{k=1}^{p} \{ c_1 w_1 (Y + Y_c - Y_{r,1})^2 + c_2 w_2 (Y + Y_c - Y_{r,2})^2 + c_3 w_3 (Y + Y_c - Y_{r,3})^2 + w_{\Delta u} (u_k - u_{k-1})^2 + w_u (u_k - u_{ref})^2 \}$$

where C is a cost function, $c_i$ is an associated confidence value of a target for source i, $w_i$ is a weight value for patches of source i target associated with each source, Y is a predicted output of the vehicle, $Y_c$ is a camera performance bias for lateral position, $Y_r$ is the target based on source i, u is a steering angle command, $u_k$ is a steering angle command at a current step, and $u_{ref}$ is a steering angle reference.

In another embodiment a computer program product is provided. The computer program product includes a set of one or more computer-readable storage media and program instructions, collectively stored in the set of one or more storage media, for causing a processor set to perform computer operations for model predictive control for automated driving in complex geometries. The operations include receiving road lane line information from a first camera associated with a first side of a vehicle, a second camera associated with a second side of the vehicle, and map data. The operations further include initiating a perception task using the road lane line information. The operations further include determining that the perception task is disturbed due to road lane geometry. The operations further include generating patches of a target path, each of the patches having an associated confidence value. The operations further include generating a combined target path by stitching together the patches of the target path. The operations further include generating, using the combined target path, desired steering commands for the vehicle. The operations further include controlling the vehicle using the desired steering commands to cause the vehicle to follow the combined target path.

In addition to one or more of the features described herein, or as an alternative, further embodiments of the computer program product may include that the operations include performing a transient behavior adjustment based on a curvature rate and error dynamics without altering a steady state response.

In addition to one or more of the features described herein, or as an alternative, further embodiments of the computer program product may include that the operations include performing an adaptive weight calculation based on a curvature and a confidence.

In addition to one or more of the features described herein, or as an alternative, further embodiments of the computer program product may include that the operations include performing an adaptive horizon calculation based on a curvature and a confidence.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
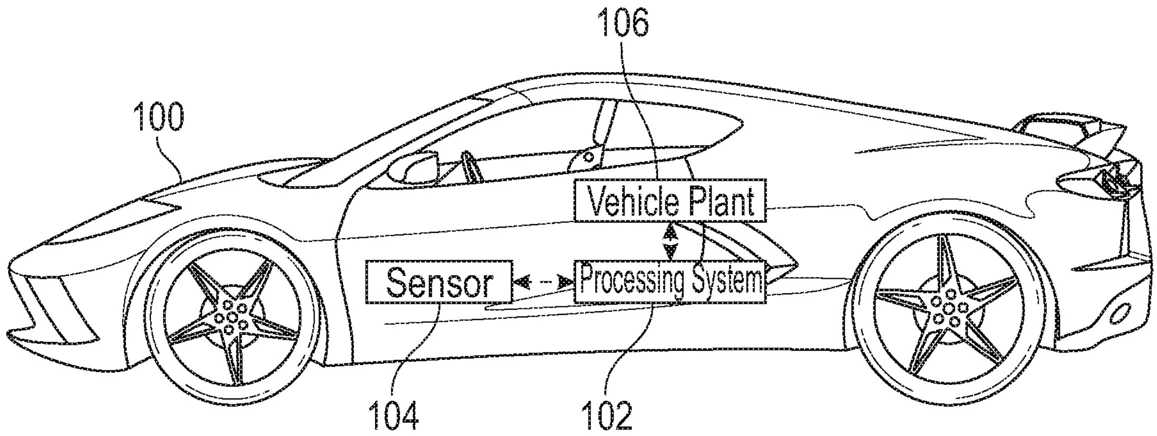
FIG. 1A illustrates a vehicle with a processing system, a sensor, and a vehicle plant according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term “controller” (e.g., a charging controller as further described herein) refers to a dedicated controller including a processor and a memory, a general controller including control modules configured to enact a control process using the dedicated controller, a network of multiple distinct controllers in communication with each other and each including processors and memory and being configured to cooperatively implement the control process, and any similar configuration for implementing the control process.

One or more embodiments described herein relates to model predictive control for automated driving in complex geometries.

Vehicles may use advanced driver assistance systems (ADASs) to improve vehicle performance and enhance driving comfort by providing automating, adapting, or enhancing vehicle systems to provide better awareness, decision-making, and control.

One example of an ADAS is an adaptive cruise control (ACC) system, which automatically adjusts the velocity of a vehicle to maintain a safe following distance from another vehicle ahead of the vehicle. Another example of an ADAS is an automated lane change (ALC) system to cause the vehicle to perform a lane change. Another example of an ADAS is a front collision alert (FCA) system to generate an alert to an operator of the vehicle warning of a potential front collision. Another example of an ADAS is a collision imminent braking (CIB) system to apply brakes of the vehicle to reduce a velocity of the vehicle. Another example of an ADAS is an automated evasive steering (AES) system to adjust the trajectory of the vehicle.

ADASs often utilize various sensors, including cameras, radar devices, and/or lidar devices, to perform perception tasks, such as object detection, classification, tracking, lane detection, road sign recognition, and obstacle avoidance. The data collected from these sensors enable vehicles to make real-time decisions, improving the overall driving experience and safety. Despite the advancements in ADAS, the precise control of vehicles remains a significant challenge.

Existing solutions for vehicle control using model predictive control (MPC) in ADASs often rely on a single reference path for trajectory planning and control. These existing approaches typically use a fixed set of references, such as lateral position and heading, to guide the vehicle along a predetermined path. While effective in straightforward driving scenarios, these approaches struggle in environments where lane lines are sporadic or distorted, such as in tight curves or cloverleaf interchanges. The reliance on a single reference path can lead to inaccuracies and reduced control performance, especially when the confidence in the detected lane lines is low.

One or more embodiments described herein address these and other shortcomings by introducing an approach to hands-free control of a vehicle using ADAS while the vehicle is operating in complex lane geometries, such as tight curvatures and cloverleafs. One or more embodiments generates dynamically constrained control paths when lane lines are sporadic, adjusting transient behavior based on curvature rate and error dynamics without altering the steady-state response. One or more embodiments calculates adaptive weights and horizon lengths as functions of curvature and confidence, ensuring more reliable and accurate vehicle control. This approach leverages multiple references from decoupled sources, such as cameras and map data, to enhance the robustness and precision of the control system in complex driving environments.

FIG. 1A shows a vehicle 100 with a processing system 102, a sensor 104, a vehicle plant 106, and a display 108 according to one or more embodiments. The vehicle 100 can be a car, a truck, a van, a bus, a motorcycle, a boat, or any other type of automobile. According to an embodiment, the vehicle 100 is a hybrid electric vehicle, such as a plug-in hybrid electric vehicle (PHEV) partially or wholly powered by electrical power. According to another embodiment, the vehicle 100 is an electric vehicle powered by electrical power. A battery (not shown) is used to provide electrical power to components of the vehicle 100, such as an electric motor (not shown), electrical components (not shown), and/or the like, including combinations and/or multiples thereof. According to one or more embodiments, the vehicle 100 includes an internal combustion engine (not shown) that provides electrical and/or mechanical energy for providing propulsion to the vehicle 100. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

The processing system 102 is located within the vehicle and is responsible for managing and processing data collected by the sensor 104. The sensor 104 represents one or more sensors, which may vary in type. The sensor 104 may be any suitable sensor(s) and/or combination of sensors, such as a camera, a radar device, a lidar device, a proximity sensor, and/or the like, including combinations and/or multiples thereof. The arrows between the sensor 104 and the processing system 102 indicate the flow of data from the sensor 104 to the processing system 102, highlighting the interaction between these components. This setup enables the vehicle 100 to perform perception tasks, which can be used for autonomous driving for example, using the data collected by the sensor 104. According to one or more embodiments, the processing system 102 can be used to implement an active safety feature (e.g., an ADAS, such as ADAS control engine 120 shown in FIG. 1B) and to control the vehicle 100 using the vehicle plant 106. The vehicle plant 106 is a collection of electromechanical components and subsystems within the vehicle 100 that are responsible for executing control commands and performing physical actions. This includes, but is not limited to, actuators, sensors, and control modules that manage various aspects of the operation of the vehicle 100, such as steering, braking, acceleration, and stability control. The vehicle plant 106 interacts with the processing system 102 to receive control signals generated by the processing system 102 and translates these signals into precise mechanical movements and adjustments for controlling the vehicle 100. This integration ensures that the vehicle 100 can respond accurately and efficiently to dynamic driving conditions, thereby enhancing the overall performance, reliability, and efficiency of the vehicle 100.

Further features and functions of the processing system 102, the sensor 104, and the vehicle plant 106 are now described with reference to FIG. 1B.

Figure 1B:
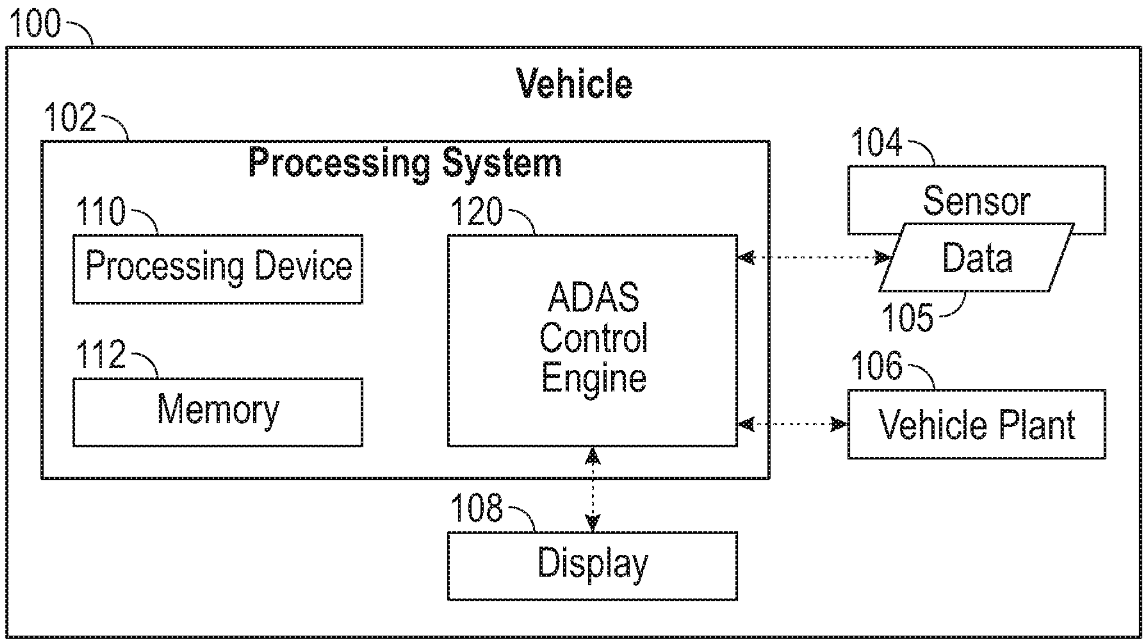
FIG. 1B illustrates the processing system of FIG. 1A according to one or more embodiments.

Particularly, FIG. 1B illustrates the processing system 102 of FIG. 1A according to one or more embodiments. According to one or more embodiments, the processing system 102 includes a processing device 110, a memory 112, and an ADAS control engine 120. It should be appreciated that the processing system 102 can be any device suitable for ADAS and/or performing model predictive control for controlling a vehicle. For example, the processing system 102 can be a device implemented in or otherwise associated with the vehicle 100, such as an electronic control unit (ECU) (also referred to as an electronic control module). As another example, the processing system 102 can be a smartphone, tablet computer, laptop computer, desktop computer, wearable computing device, and/or the like, including combinations and/or multiples thereof. As yet another example, the processing system 102 can be the processing system 500 of FIG. 5 and/or can include one or more components of the processing system 500 of FIG. 5.

The processing device 110 is responsible for executing instructions and managing the overall operation of the processing system 102. The processing device 110 can be any suitable processing circuitry for executing instructions and processing data. For example, the processing device 110 can be a microcontroller, microprocessor, application-specific integrated circuit (ASIC), or any other type of processing unit capable of handling the computational demands of the processing system 102. The processing device 110 is an example of one or more of the processing devices 521 of FIG. 5, as described in more detail herein.

The memory 112 stores data (e.g., data 105), computer-readable instructions, and algorithms useful for operation of the processing system 102. This may include real-time data processing, historical data analysis, and storage of firmware or software programs. The memory 112 is any suitable device for storing data, such as the data 105 received from the sensor 104, and/or instructions. For example, the memory 112 can be a combination of volatile memory (e.g., random access memory) and non-volatile memory (e.g., read-only memory, flash memory). The memory 112 is an example of one or more of the system memory 522, the random access memory 523, and/or the read-only memory 524 of FIG. 5, as described in more detail herein.

The processing system 102 receives data 105 (from the sensor 104) about the vehicle 100 (e.g., telemetry data about the vehicle) and/or about the environment in which the vehicle is operating (e.g., images of objects in the environment, point cloud data of objects in the environment, etc.). According to one or more embodiments, the sensor 104 is one or more cameras, and the data 105 are images captured by the one or more cameras, such as images of a lane in which the vehicle 100 is traveling, including any lane markers (e.g., lane lines, turn indicators, etc.) of the lane. The data 105 can be useful, for example, for performing perception tasks, which in turn are used to control the vehicle using an ADAS.

The ADAS control engine 120 is responsible for managing and executing advanced driver assistance systems functionalities. The ADAS control engine 120 is designed to enhance vehicle performance and efficiency by automating, adapting, and/or enhancing various vehicle systems to provide better awareness, decision-making, and control. The ADAS control engine 120 is responsible for performing various tasks associated with ADAS, such as perception tasks, planning tasks, and control tasks as now described in more detail.

According to one or more embodiments, the ADAS control engine 120 includes an optimizer that analyzes predicted values based on a model of the vehicle 100, calculates an amount of error the model has compared to references for the predictions, multiplies the outputs for those errors by a set of weights.

The ADAS control engine 120 processes data (e.g., data 105) received from various sensors (e.g., the sensor 104), such as cameras, radar devices, and lidar devices, to perform perception tasks including object detection, classification, tracking, lane detection, road sign recognition, and obstacle avoidance. By analyzing this sensor data, the ADAS control engine 120 can generate real-time situational awareness of the environment in which the vehicle 100 operates.

Using the information from the perception tasks, the ADAS control engine 120 can perform planning tasks, which may include planning a trajectory for the vehicle 100. For example, one of the functions of the ADAS control engine 120 is to implement MPC algorithms for trajectory planning and control. The ADAS control engine 120 uses the data (e.g., data 105) from the sensors (e.g., sensor 104) to predict the future states of the vehicle 100 and optimize control inputs to achieve the desired trajectory. This involves calculating the optimal steering, acceleration, and braking commands to ensure the vehicle 100 follows the planned path while maintaining operating efficiency, reliability, and comfort.

The ADAS control engine 120 controls the vehicle 100 by sending commands to the vehicle plant 106, which includes electromechanical components and subsystems responsible for executing these commands. The commands from the from the ADAS control engine 120 may include steering angles, acceleration, and braking commands, among others. The ADAS control engine 120 dynamically adjusts these commands based on the current driving conditions and available ECU resources, ensuring that the vehicle 100 operates efficiently. The commands are then transmitted to the vehicle plant 106, where actuators and control modules translate them into physical actions, such as turning the steering wheel, applying the brakes, or adjusting the throttle. This seamless integration between the ADAS control engine 120 and the vehicle plant 106 enables the vehicle 100 to respond quickly and accurately to dynamic driving environments, enhancing overall performance and operation of the vehicle 100.

In summary, the ADAS control engine 120 is a sophisticated module within the processing system 102 that integrates sensor data processing, perception tasks, planning tasks, and vehicle control using model predictive control to enhance vehicle efficiency and performance. The ADAS control engine 120 also ensures real-time, accurate control of the vehicle 100 by dynamically adapting to resource constraints and optimizing control inputs based on the current driving conditions.

Figure 2:
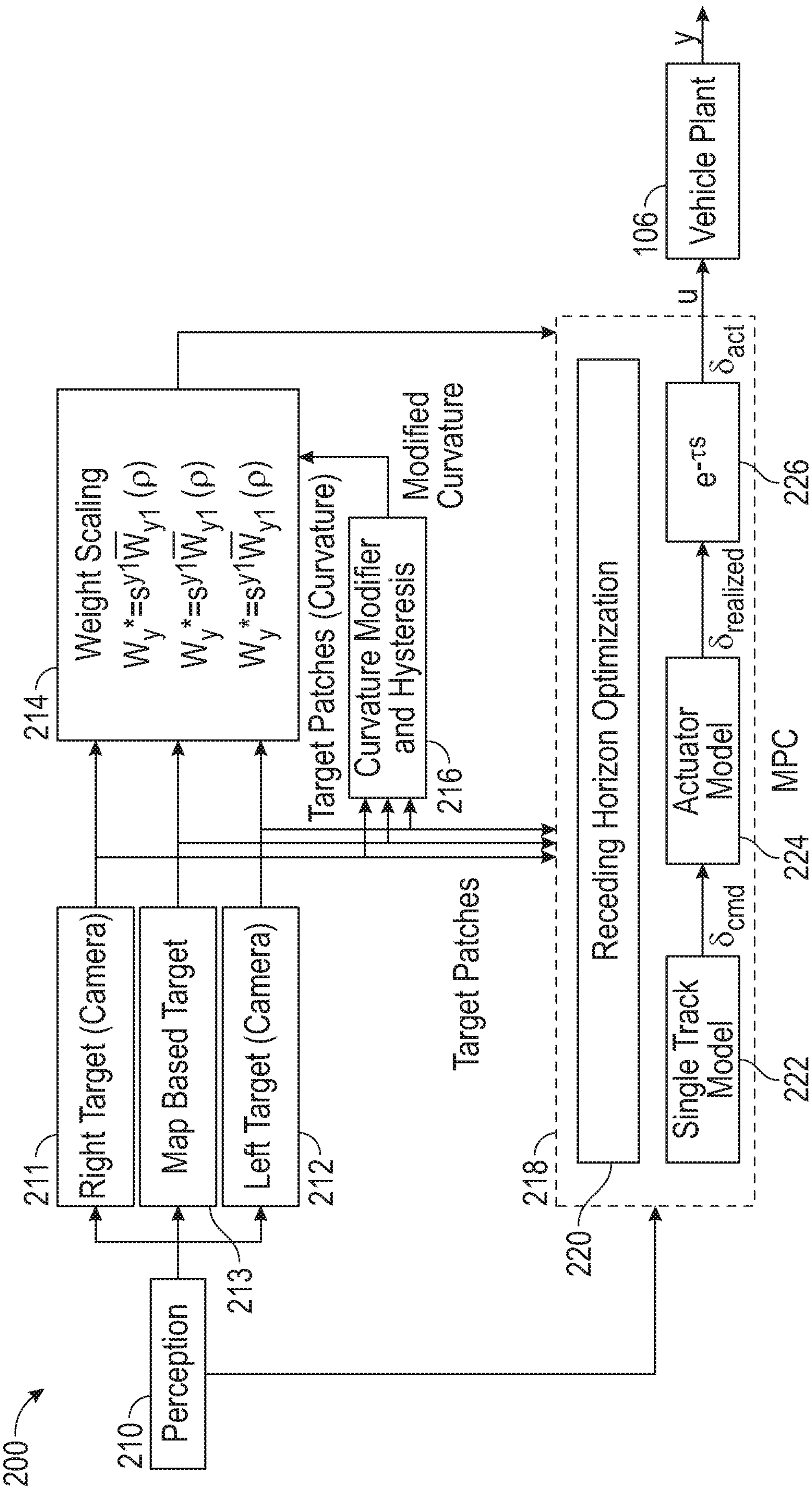
FIG. 2 illustrates a block diagram of a system for model predictive control for automated driving in complex geometries according to one or more embodiments.

FIG. 2 illustrates a block diagram of a system 200 for model predictive control for automated driving in complex geometries according to one or more embodiments. The system 200 is designed to handle complex driving environments, such as tight curves and cloverleaf interchanges, by leveraging multiple references from decoupled sources and dynamically adjusting control parameters. The system 200 can be implemented using the ADAS control engine 120 of the processing system 102 of the vehicle 100. According to one or more embodiments, the system 200 includes a perception module 210, a right target (camera) 211, a left target (camera) 212, a map based target 213, a weight scaling module 214, a curvature modifier and hysteresis module 216, an MPC module 218, and the vehicle plant 106.

The perception module 210 receives road lane information from various sources, such as cameras (e.g., sensor 104), map data, and/or the like, including combinations and/or multiples thereof. The perception module 210 performs perception tasks and generates the right target (camera) 211, the left target (camera) 212, and the map based target 213. The right target (camera) 211 identifies a target (e.g., a lane line) on the right side of the vehicle 100 using one or more images of the road and lane lines on the right side of the vehicle 100. The left target (camera) 212 identifies a target (e.g., a lane line) on the left side of the vehicle 100 using one or more images of the road and lane lines on the left side of the vehicle 100. The map based target 213 identifies a target (e.g., a lane line) using map data. Each of the right target (camera) 211, the left target (camera) 212, and the map based target 213 are sent to the weight scaling module 214, the curvature modifier and hysteresis module 216, and the MPC module 218 as target patches (e.g., curvatures).

The weight scaling module 214 adjusts the weights of the target patches based on their confidence values. The weights are scaled according to the following equations:

$$W_{Y_1}^* = S^{y_1}\overline{W}_{y1}(\rho)$$

$$W_{Y_2}^* = s^{y_2}\overline{W}_{y2}(\rho)$$

$$W_{Y_3}^* = s^{y_3}\overline{W}_{y3}(\rho)$$

where $W_{Y_1}^*$ is the scaled weight of output term for target 1, $s^{y_1}$ is the scaling factor suggested by normal operation fusion for target 1, $\overline{W}_{y1}$ is raw output weight for target 1, and $\rho$ is curvature.

The curvature modifier and hysteresis module 216 modifies the curvature of the target patches to account for transient behavior and avoid oscillations. This is accomplished by applying hysteresis-defined-filters to smooth out rapid changes (e.g., changes above a threshold) in curvature. In other words, when the curvature of the target is sufficiently high (e.g., above a threshold) and when a sufficiently high change (e.g., above a threshold) is detected, a filter is applied on the curvature signal. Based on the direction of the change, one of two filters is used to reach a desired behavior. A modified curvature is fed back into the weight scaling module 214, and weighting is applied to the curvature. Results from the weight scaling performed by the weight scaling module 214 are fed into the MPC module 218.

The MPC module 218 receives the target patches, as well as information from the perception module 210 and results from the weight scaling performed by the weight scaling module 214, and generates vehicle control commands u, such as steering commands $\delta_{cmd}$, which are sent to the vehicle plant 106 to control the vehicle 100. The MPC module 218 includes a receding horizon optimization module 220, a single track model 222, an actuator model 224, and an error correction module 226.

The receding horizon optimization module 220 optimizes the control inputs over a prediction horizon to minimize a cost function (as described herein with reference to FIG. 4B) that includes the errors between the predicted and reference paths.

The single track model 222 represents the vehicle dynamics and is used to predict future states for the vehicle 100 based on inputs from the perception module 210. The single track model 222 generates a steering command $\delta_{cmd}$, which is input to the actuator model 224. The actuator model 224 simulates the behavior of the vehicle's actuators, such as the steering system, to ensure accurate control commands. The actuator model 224 generates a realized steering command $\delta_{realized}$, which is input to the error correction module 226. The steering command is what the controller requests from the actuator. The realized steering command $\delta_{realized}$ is the command that the actuator (e.g., the motor rotating the steering column) generates. In an ideal actuator, these two values are equal; however, due to perturbation, disturbance, and noise, these values often differ. The error correction module 226 receives the realized steering command $\delta_{realized}$ and generates an actual steering command $\delta_{act}$ by applying an error correction to reduce any difference between the a target path and the realized steering command $\delta_{realized}$.

The actual steering command $\delta_{act}$ is fed into the vehicle plant 106 to control the vehicle 100 to cause the vehicle 100 to follow the target path. More particularly, the vehicle plant 106 translates the steering commands into physical actions, such as adjusting the steering angle, to guide the vehicle along the target path.

The system 200 ensures precise and reliable vehicle control in complex driving environments by dynamically adjusting the control parameters based on the confidence values of the target patches and the modified curvature. This approach enhances the overall performance and safety of the vehicle 100.

Figure 3:
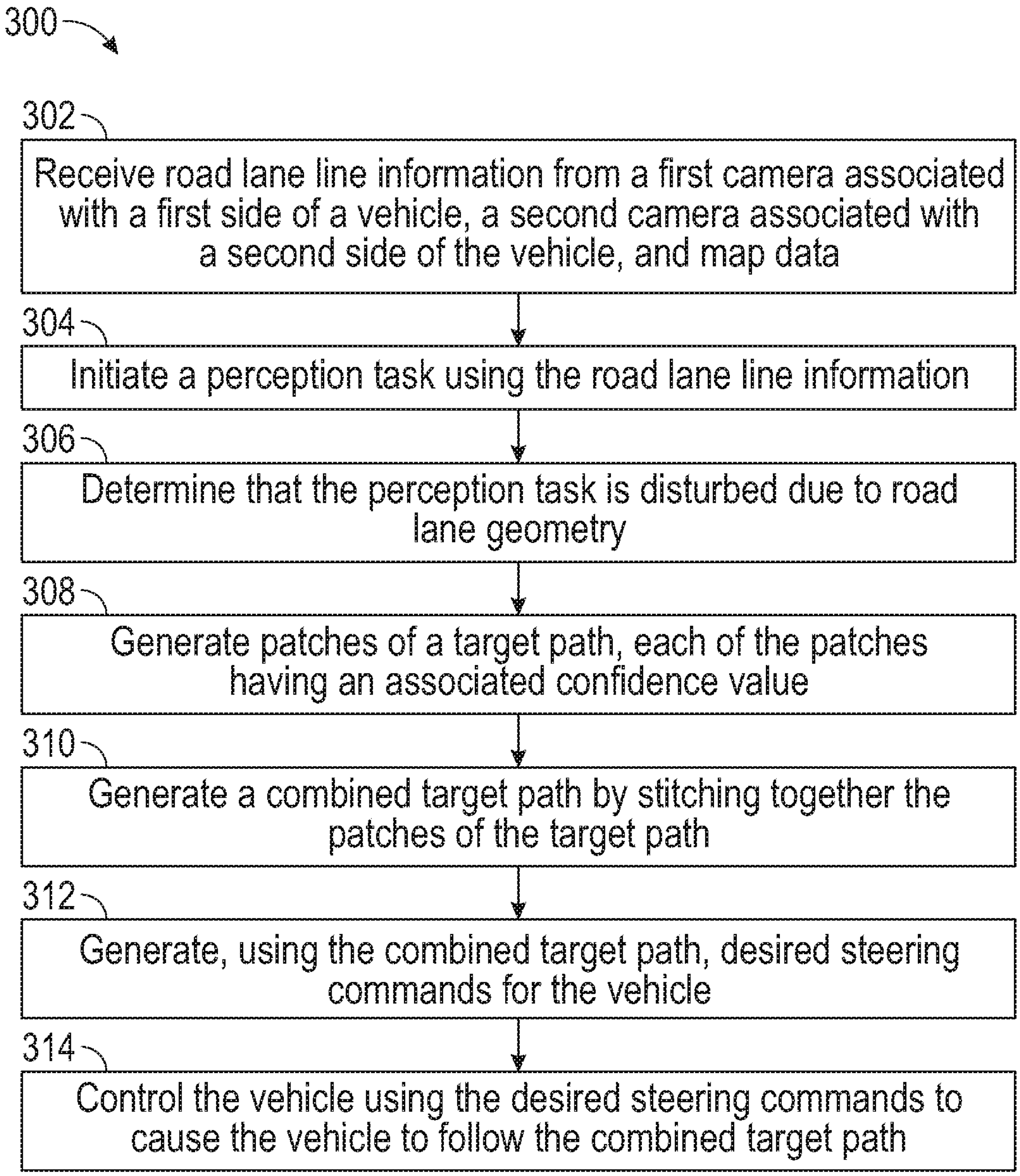
FIG. 3 illustrates a flow diagram of a method for model predictive control for automated driving in complex geometries according to one or more embodiments.

FIG. 3 illustrates a flow diagram of a method for model predictive control for automated driving in complex geometries according to one or more embodiments. The method 300 can be implemented using any suitable system or device. For example, the method 300, and its steps, can be implemented using the processing system 102 of FIGS. 1A and 1B, by the processing system 500 of FIG. 5, and/or the like, including combinations and/or multiples thereof. The method 300 is now described with reference to at least portions of the preceding figures but is not so limited.

At block 302, the method 300 begins by receiving road lane line information from a first camera (e.g., sensor 104) associated with a first side of a vehicle (e.g., vehicle 100), a second camera (e.g., sensor 104) associated with a second side of the vehicle, and map data. This step involves collecting data from multiple sources (e.g., sensors, map databases, etc). to ensure comprehensive lane detection. The first camera and second camera are examples of the sensor 104 in FIGS. 1A and 1B, which each captures images of the road and lane lines. The map data can be obtained from a navigation system integrated into the vehicle. Map data refers to digital information obtained from a navigation system or other suitable source integrated into the vehicle 100. The map data includes detailed lane information, road geometries, and other relevant features of the driving environment. The map data is used to enhance lane detection and trajectory planning by providing an additional reference source alongside camera inputs.

At block 304, the method 300 continues by initiating a perception task (e.g., perception module 210) using the road lane line information. This involves processing the collected data to identify and understand the lane lines and other relevant road features and generate targets, such as the right target (camera) 211, the left target (camera) 212, and the map based target 213. The ADAS control engine 120 in FIG. 1B is responsible for performing this perception task, which includes object detection, classification, tracking, and lane detection.

Figure 4A:
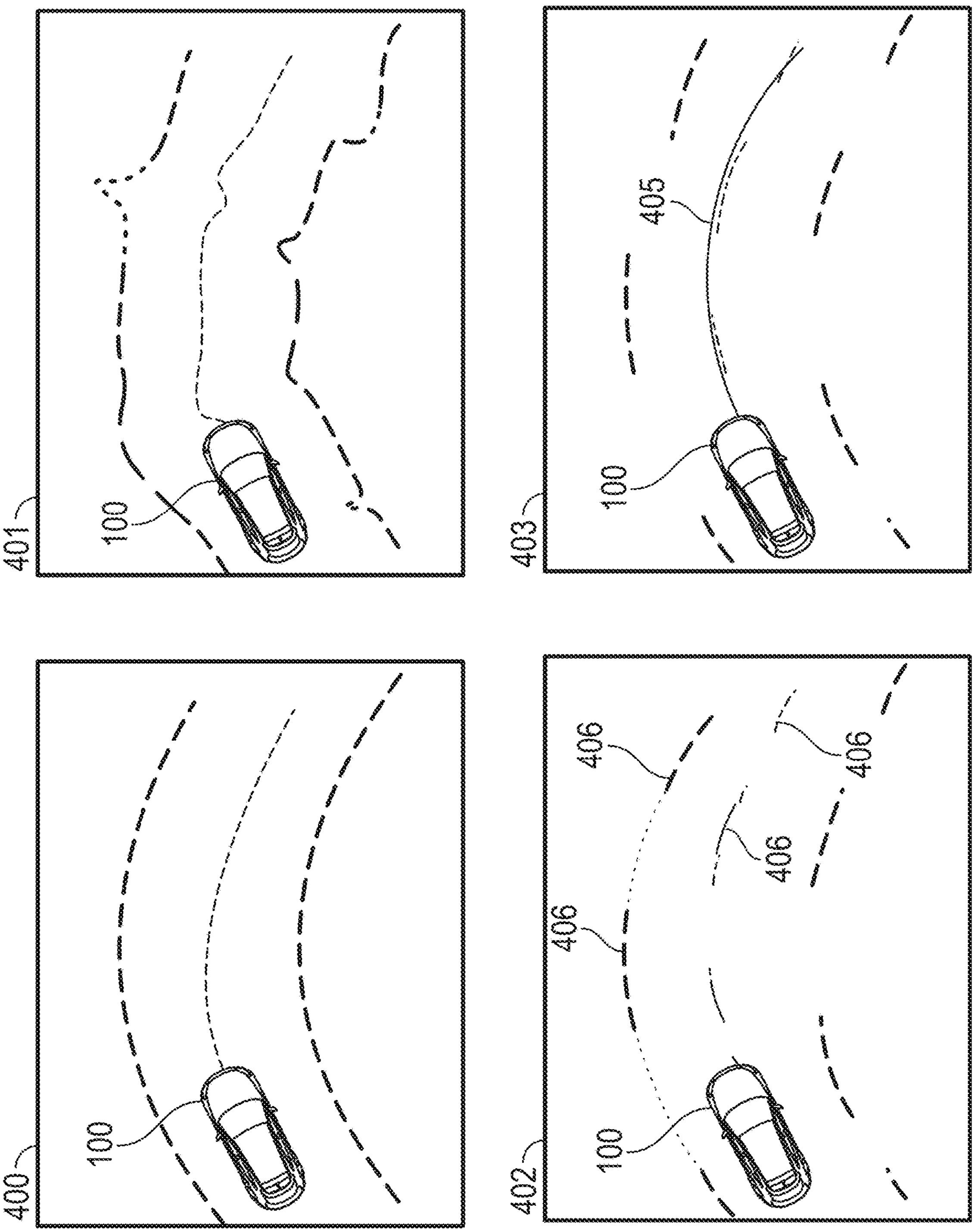
FIG. 4A illustrates diagrams of scenarios for model predictive control for automated driving in complex geometries according to one or more embodiments.

At block 306, the method 300 determines that the perception task is disturbed due to road lane geometry. This step identifies any issues or disturbances in the perception task caused by complex road geometries, such as tight curves or cloverleaf interchanges. The processing system 102 analyzes the data to detect inconsistencies or gaps in the lane line information. As an example, FIG. 4A, shows various scenarios 400, 401, 402, 403. More particularly, FIG. 4A illustrates diagrams of scenarios 400, 401, 402, 403 for model predictive control for automated driving in complex geometries according to one or more embodiments. In the scenario 400, the perception task is not disturbed, while in the scenario 401, the perception task is disturbed as shown.

With continued reference to FIG. 3, at block 308, once a disturbance is identified, the method 300 generates patches of a target path, each of the patches having an associated confidence value. This step involves breaking down the target path into smaller segments or patches, each with a confidence level indicating the reliability of the detected lane lines. The ADAS control engine 120 calculates these patches based on the available data from the cameras and map. The confidence values are assigned to each patch of the target path to indicate the reliability of the detected lane lines for the respective patches. The confidence values are derived from the quality and consistency of the data obtained from various sources, such as cameras and map data. Higher confidence values signify more reliable patches, which are prioritized when generating the combined target path to ensure accurate and stable vehicle control.

At block 310, the method 300 includes generating a combined target path 405 by stitching together the patches 406 of the target path. This is shown in the scenario 402 of FIG. 4A. With continued reference to FIG. 3, block 310 involves combining the individual patches to form a continuous and reliable target path 405 for the vehicle 100 to follow. The ADAS control engine 120 merges the patches 406, taking into account their confidence values to prioritize more reliable segments.

Using the combined target path, at block 312, the method 300 generates desired steering commands for the vehicle 100. This step involves calculating the steering inputs used to follow the combined target path 405 accurately. The ADAS control engine 120 computes these commands based on the current position and speed of the vehicle 100 and the geometry of the combined target path.

At block 314, the ADAS control engine 120 causes the vehicle plant 106 to control the vehicle 100 using the desired steering commands to cause the vehicle 100 to follow the combined target path 405. This step involves sending the calculated steering commands to the vehicle plant 106 to cause the vehicle 100 to follow the combined target path. The vehicle plant 106 receives these commands and translates them into physical actions, such as adjusting the steering angle, to guide the vehicle 100 along the path. This is shown by the segment 403 of FIG. 4A.

Additional processes also may be included, and it should be understood that the processes depicted in FIG. 3 represent illustrations, and that other processes may be added, or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processing device 110 of FIG. 1B, the processor(s) 521 of FIG. 5, and/or the like, including combinations and/or multiples thereof) of a computing system (e.g., the processing system 102 of FIGS. 1A and 1B, the processing system 500 of FIG. 5, and/or the like, including combinations and/or multiples thereof), cause the processor to perform the processes described herein.

Figure 4B:
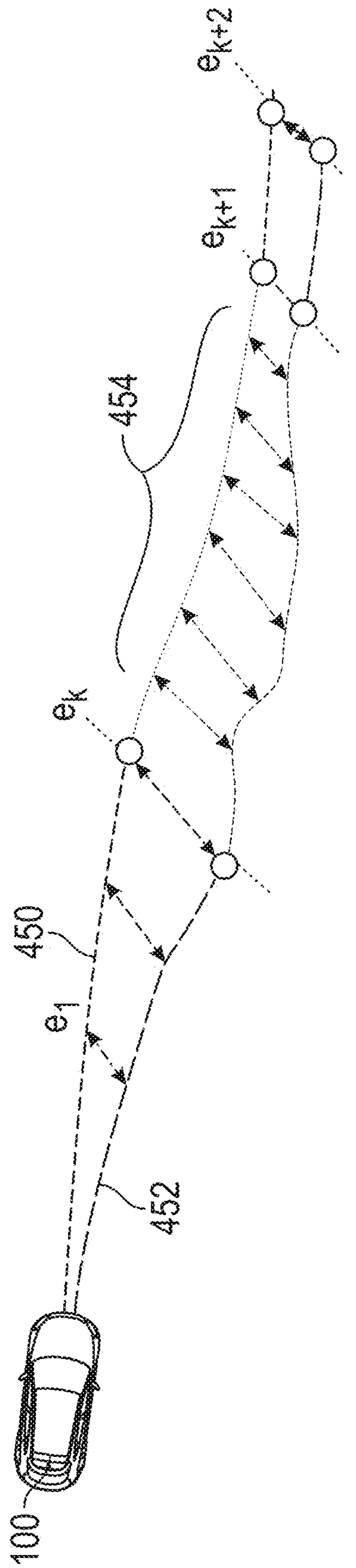
FIG. 4B illustrates a diagram of sporadic path following for the vehicle of FIG. 1 using model predictive control in complex geometries according to one or more embodiments.

FIG. 4B illustrates a diagram of sporadic path following for the vehicle 100 using model predictive control in complex geometries according to one or more embodiments. The diagram shows the vehicle 100 navigating a path with sporadic lane line information. A predicted path 450 that it is anticipated or predicted that the vehicle 100 will follows, while a desired path 452 represents the path that is desired for the vehicle 100 to follow.

The diagram of FIG. 4B also shows error points $e_i$, $e_k$, $e_{k+1}$, $e_{k+2}$, which represent the errors between the predicted path 450 and the desired path 452 at various steps k.

The weighted out region 454 represents a region where the confidence in the desired path 452 is low (e.g., less than a threshold), leading to the errors being weighted out in the MPC cost function.

The cost function C is calculated for each of multiple references (e.g., the right target (camera 211), the left target (camera 212), and the map based target 213)) according to the following equation:

$$C = \sum_{k=1}^{p}\{c_1 w_1 (Y + Y_c - Y_{r,1})^2 + c_2 w_2 (Y + Y_c - Y_{r,2})^2 + c_3 w_3 (Y + Y_c - Y_{r,3})^2 + w_{\Delta u}(u_k - u_{k-1})^2 + w_u (u_k - u_{ref})^2\}$$

where C is the cost function, $c_i$ is a confidence value of a target for source i, $w_i$ is a weight value for patches of source i target, Y is a predicted output of the vehicle (e.g., predicted path 450), $Y_c$ is a camera performance bias for lateral position, $Y_r$ is the target based on source i (e.g., desired path 452), u is the steering angle command, $u_k$ is steering angle command at current step, and $u_{ref}$ is a reference steering wheel angle. It should be appreciated that the reference steering wheel angle $u_{ref}$ is equivalent to a feed forward steering command $\delta_{ff}$.

The feed forward steering command $\delta_{ff}$ can be expressed using the following equation:

$$\delta_{ff} = -k_k (L + K_{us} V_x^2) \left[ \frac{6}{x_{mp}^2}(1 - 2r_{LA})0 \frac{2}{x_{mp}}(2 - 3r_{LA})0 \right] e + k_k (L + K_{us} V_x^2) k_d$$

where $$k_k = -\frac{x_{mp}}{2(2 - 3r_{LA})\left(\frac{V_x^2 m l_f}{C_r L} - l_r\right) - x_{mp}}$$

where L is the wheelbase of the vehicle, $K_{us}$ is the understeering coefficient, $V_x$ is longitudinal velocity, $x_{mp}$ is the distance to the desired merge pint to target lane, $r_{LA}$ is a calibration parameter, m is vehicle mass, $l_f$ is distance from center of gravity to front wheels, Cr is rear wheel cornering stiffness.

The feed forward steering command $\delta_{ff}$ is calculated for stead state and therefore does not provide information about finite time convergence. To achieve this, the following vanishing control equation can be used:

$$\delta_{cmd} = K_t \dot{k}_d \times \tan(c \times e)$$

where $c_{[1\times4]}$ is a tuning parameter and e is a modified look-ahead error state from the vehicle dynamics state-space. This control equation by design vanishes where there is no change in curvature, hence the steady state response of the system is not altered. The final theorem for this is expressed as follows:

$$e_{ss} = \lim_{s\to 0} sE(s) = -[(A - B_1K)]^{-1}[B_1\delta_{ff} + B_2k_d + B_1\delta_{cmd}] =$$

$$\begin{bmatrix} x_{mp}\dfrac{x_{mp}\left(L + K_{us}V_x^2\right) + k_k'\left[2(2-3r_{LA})\left(\dfrac{V_x^2 m l_f}{C_r L} l_r\right) - x_{mp}\right]}{6k_k'(2r_{LA}-1)} \\ 0 \\ -l_r + \dfrac{mV_x^2 l_f}{C_r L} \\ 0 \end{bmatrix}$$

$$k_{d-}K_t\left[1 - \tanh^2\left(\sum c_i \times e_i\right)\right]\dot{k}_d.$$

According to one or more embodiments, weight adjustment can be performed (e.g., using the weight scaling module 214) to exclude low confidence values near a far end of the prediction horizon in favor of using nearer values for the cost function calculation. For example, if accumulated curvature is high in beginning of the control horizon, increase the weight for the beginning part of the horizon and increase gain for the ending part of the horizon. If confidence is higher for the beginning part of the horizon, de-gain the remaining portions of the horizon.

According to one or more embodiments, the curvature can be modified (e.g. using the curvature modifier and hysteresis module 216). For example, if curvature is rapidly decreasing, can delay the ramp down; however, if the curvature is increasing, the curvature can be aided to be snapped back to the previous value.

For example, during a curve, one or more embodiments prevents the system 200 from wandering when low frequency disturbances exist in the curvature of the target. At an exit of the curve, curvature-based feed forward is maintain to avoid going outer curve due to feed forward leading the curvature signal.

One or more embodiments offer significant technical benefits. For example, one or more embodiments described herein offer significant benefits in terms of vehicle functioning by enhancing the precision and reliability of vehicle control in complex driving environments. By leveraging multiple references from decoupled sources such as cameras and map data, and dynamically adjusting control parameters based on confidence values and modified curvature, one or more embodiments ensures accurate path following even in scenarios with sporadic or distorted lane lines. This approach reduces the likelihood of control errors, improves the vehicle's ability to navigate complex geometries (e.g., tight curves and cloverleaf interchanges), and enhances overall driving efficiency and comfort. Additionally, the adaptive weight and horizon length calculations contribute to more robust and stable vehicle control, further optimizing the performance of advanced driver assistance systems.

Figure 5:
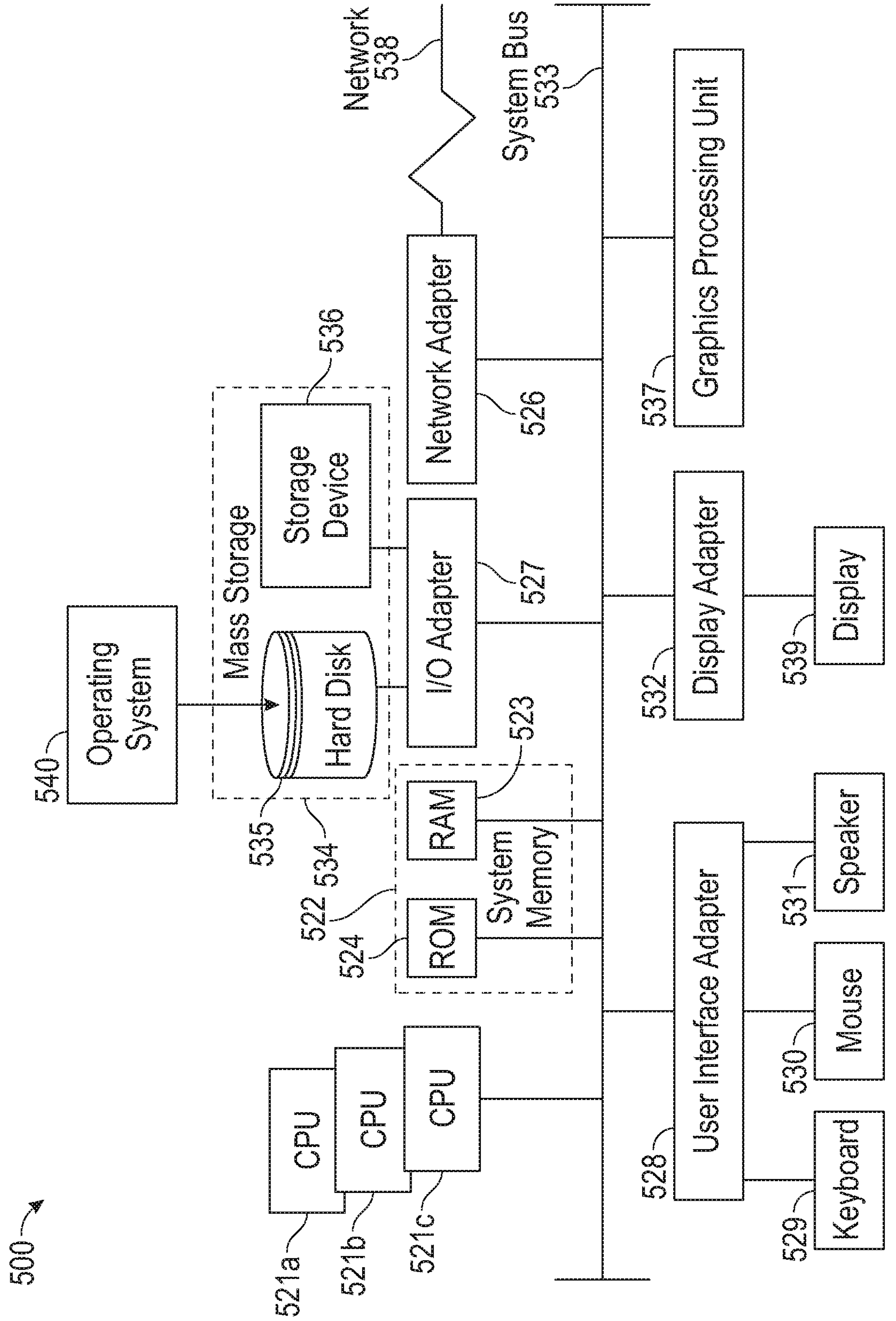
FIG. 5 illustrates a block diagram of a processing system for model predictive control for automated driving in complex geometries according to one or more embodiments.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments described herein, the processing system 500 is an example of a cloud computing node of a cloud computing environment. In examples, processing system 500 has one or more central processing units (referred to also as "processors" or "processing resources" or "processing devices") 521*a*, 521*b*, 521*c*, etc. (collectively or generically referred to as processor(s) 521 and/or as processing device(s) 521). In aspects of the present disclosure, each processor 521 can include a reduced instruction set computer (RISC) microprocessor. Processors 521 are coupled to a system memory 522 and/or various other components via a system bus 533. The system memory 522 can include one or more temporary and/or persistent memory devices, such as a random access memory (RAM) 523, a read-only memory (ROM) 524, and/or the like, including combinations and/or multiples thereof. The system bus 533 may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 535 and/or a storage device 536 or any other similar component. I/O adapter 527, hard disk 535, and storage device 536 are collectively referred to herein as mass storage 534. Operating system 540 for execution on processing system 500 may be stored in mass storage 534. The network adapter 526 interconnects system bus 533 with an outside network 538 enabling processing system 500 to communicate with other such systems.

A display (e.g., a display monitor) 539 is connected to system bus 533 by display adapter 532, which may include a graphics adapter to improve the performance of graphics intensive applications and a video controller. In one aspect of the present disclosure, adapters 526, 527, and/or 532 may be connected to one or more I/O buses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit.

In some aspects of the present disclosure, processing system 500 includes a graphics processing unit (GPU) 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, processing system 500 includes processing capability in the form of processors 521, storage capability including the system memory 522 and mass storage 534, input means such as keyboard 525 and mouse 530, and output capability including speaker 531 and display 539. In some aspects of the present disclosure, a portion of system memory 522 and mass storage 534 collectively store the operating system 540 to coordinate the functions of the various components shown in processing system 500.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for model predictive control for automated driving in complex geometries, the method comprising:

receiving road lane line information from a first camera associated with a first side of a vehicle, a second camera associated with a second side of the vehicle, and map data;

initiating a perception task using the road lane line information;

determining that the perception task is disturbed due to road lane geometry;

generating patches of a target path, each of the patches having an associated confidence value;

generating a combined target path by stitching together the patches of the target path;

generating, using the combined target path, desired steering commands for the vehicle; and controlling the vehicle using the desired steering commands to cause the vehicle to follow the combined target path, wherein generating the desired steering commands for the vehicle includes calculating a cost function using the associated confidence value for each of the patches and a weight associated with each of the patches, and wherein the cost function is calculated according to the following equation:

$$C = \sum_{k=1}^{p}\{c_1 w_1(Y + Y_c - Y_{r,1})^2 + c_2 w_2(Y + Y_c - Y_{r,2})^2 + c_3 w_3(Y + Y_c - Y_{r,3})^2 + w_{\Delta u}(u_k - u_{k-1})^2 + w_u(u_k - u_{ref})^2\}$$

where C is the cost function, $c_i$ is the associated confidence value of the target for source i, $w_i$ is the weight value for patches of source i target, associated with each source, Y is a predicted output of the vehicle, $Y_c$ is a camera performance bias for lateral position, $Y_r$ is the target based on source i, u is a steering angle command, $u_k$ is a steering angle command at a current step, and $u_{ref}$ is a steering angle reference.

2. The computer-implemented method of claim 1, wherein generating the patches of the target path comprises generating a first patch using the road lane line information from the first camera.

3. The computer-implemented method of claim 2, wherein generating the patches of the target path further comprises generating a second patch using the road lane line information from the second camera.

4. The computer-implemented method of claim 3, wherein generating the patches of the target path further comprises generating a third patch using the road lane line information from the map data.

5. The computer-implemented method of claim 4, wherein generating the combined target path by stitching together the patches of the target path comprises stitching together at least two of the first patch, the second patch, and the third patch.

6. The computer-implemented method of claim 4, wherein generating the combined target path by stitching together the patches of the target path comprises stitching together the first patch, the second patch, and the third patch.

7. A vehicle comprising:

a first camera;

a second camera;

a vehicle plant; and a processing system comprising:

a memory comprising computer readable instructions; and a processing device for executing the computer readable instructions, the computer readable instructions controlling the processing system to perform operations for model predictive control for automated driving in complex geometries, the operations comprising:

receiving road lane line information from the first camera, the second camera, and map data;

initiating a perception task using the road lane line information;

determining that the perception task is disturbed due to road lane geometry;

generating patches of a target path, each of the patches having an associated confidence value;

generating a combined target path by stitching together the patches of the target path;

generating, using the combined target path, desired steering commands for the vehicle; and controlling the vehicle using the desired steering commands to cause the vehicle to follow the combined target path, wherein generating the desired steering commands for the vehicle includes calculating a cost function using the associated confidence value for each of the patches and a weight associated with each of the patches, and wherein the cost function is calculated according to the following equation:

$$C = \sum_{k=1}^{p} \{ c_1 w_1 (Y + Y_c - Y_{r,1})^2 + c_2 w_2 (Y + Y_c - Y_{r,2})^2 + c_3 w_3 (Y + Y_c - Y_{r,3})^2 + w_{\Delta u}(u_k - u_{k-1})^2 + w_u (u_k - u_{ref})^2 \}$$

where C is a cost function, $c_i$ is an associated confidence value of a target for source i, $w_i$ is a weight value for patches of source i target associated with each source, Y is a predicted output of the vehicle, $Y_c$ is a camera performance bias for lateral position, $Y_r$ is the target based on source i, u is a steering angle command, $u_k$ is a steering angle command at a current step, and $u_{ref}$ is a steering angle reference.

8. The vehicle of claim 7, wherein generating the patches of the target path comprises generating a first patch using the road lane line information from the first camera.

9. The vehicle of claim 8, wherein generating the patches of the target path further comprises generating a second patch using the road lane line information from the second camera.

10. The vehicle of claim 9, wherein generating the patches of the target path further comprises generating a third patch using the road lane line information from the map data.

11. The vehicle of claim 10, wherein generating the combined target path by stitching together the patches of the target path comprises stitching together at least two of the first patch, the second patch, and the third patch.

12. The vehicle of claim 10, wherein generating the combined target path by stitching together the patches of the target path comprises stitching together the first patch, the second patch, and the third patch.

13. A computer program product comprising:

a set of one or more non-transitory computer-readable storage media; and program instructions, collectively stored in the set of one or more storage media, for causing a processor set to perform computer operations for model predictive control for automated driving in complex geometries, the operations comprising:

receiving road lane line information from a first camera associated with a first side of a vehicle, a second camera associated with a second side of the vehicle, and map data;

initiating a perception task using the road lane line information;

determining that the perception task is disturbed due to road lane geometry;

generating patches of a target path, each of the patches having an associated confidence value;

generating a combined target path by stitching together the patches of the target path;

generating, using the combined target path, desired steering commands for the vehicle; and controlling the vehicle using the desired steering commands to cause the vehicle to follow the combined target path; and performing a transient behavior adjustment based on a curvature rate and error dynamics without altering a steady state response.

14. The computer program product of claim 13, wherein the operations further comprise performing an adaptive weight calculation based on a curvature and a confidence.

15. The computer program product of claim 13, wherein the operations further comprise performing an adaptive horizon calculation based on a curvature and a confidence.

16. The computer program product of claim 13, wherein generating the desired steering commands includes calculating a cost function.

17. The computer program product of claim 16, wherein the cost function is calculated using the associated confidence value for each of the patches and a weight associated with each of the patches.

18. The computer program product of claim 17, wherein the cost function is calculated according to the following equation:

$$C = \sum_{k=1}^{p} \{ c_1 w_1 (Y + Y_c - Y_{r,1})^2 + c_2 w_2 (Y + Y_c - Y_{r,2})^2 + c_3 w_3 (Y + Y_c - Y_{r,3})^2 + w_{\Delta u}(u_k - u_{k-1})^2 + w_u (u_k - u_{ref})^2 \}$$

where C is a cost function, $c_i$ is an associated confidence value of a target for source i, $w_i$ is a weight value for patches of source i target associated with each source, Y is a predicted output of the vehicle, $Y_c$ is a camera performance bias for lateral position, $Y_r$ is the target based on source i, u is a steering angle command, $u_k$ is a steering angle command at a current step, and $u_{ref}$ is a steering angle reference.

19. The computer program product of claim 13, wherein generating the patches of the target path further comprises generating a third patch using the road lane line information from the map data, and wherein generating the combined target path by stitching together the patches of the target path comprises stitching together at least two of the first patch, the second patch, and the third patch.

20. The computer program product of claim 13, wherein generating the patches of the target path further comprises generating a third patch using the road lane line information from the map data, and wherein generating the combined target path by stitching together the patches of the target path comprises stitching together the first patch, the second patch, and the third patch.

* * * * *